G. W. MYERS.
Apparatus for Purifying Oils.
No. 147,783.            Patented Feb. 24, 1874.
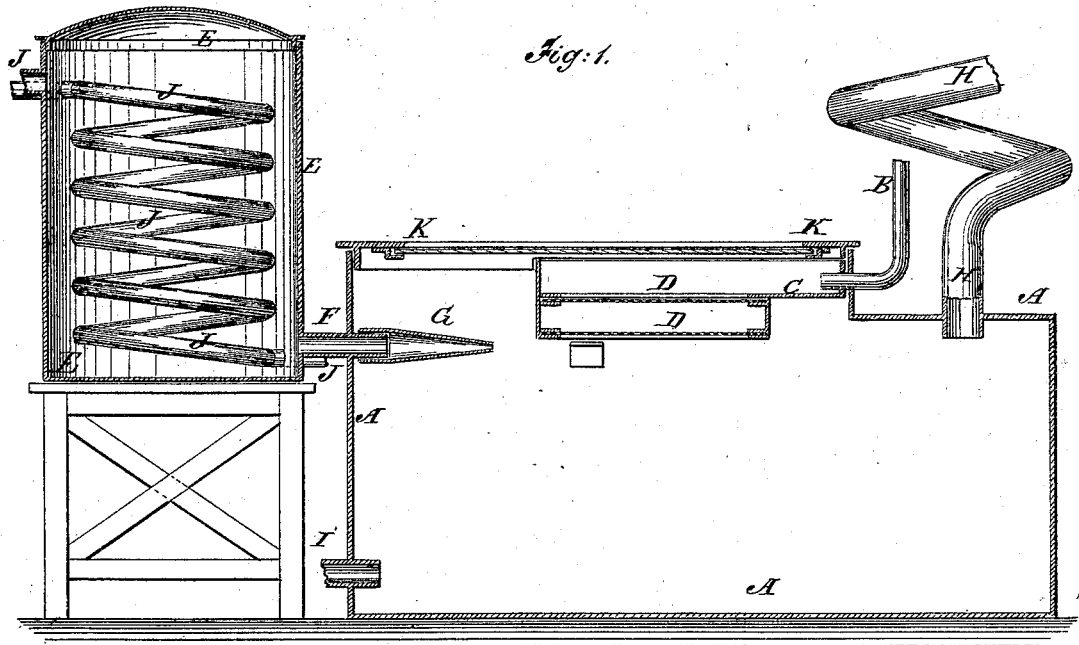
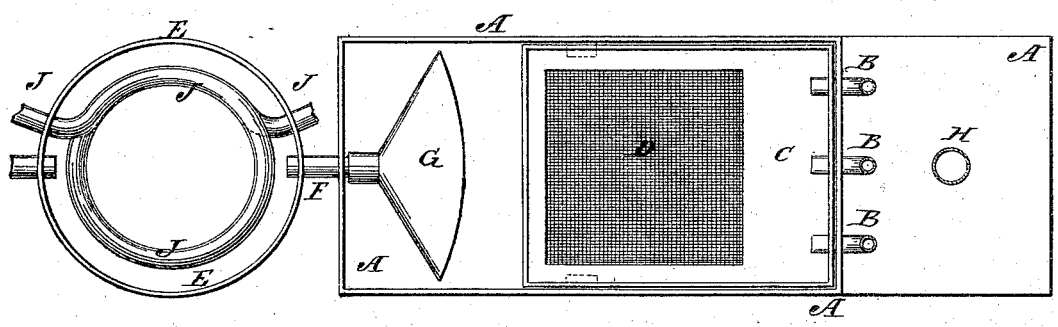

UNITED STATES PATENT OFFICE.

GEORGE W. MYERS, OF MEREDITH, PENNSYLVANIA.

IMPROVEMENT IN APPARATUS FOR PURIFYING OILS.

Specification forming part of Letters Patent No. 147,783, dated February 24, 1874; application filed December 29, 1873.

*To all whom it may concern:*

Be it known that I, GEORGE W. MYERS, of Meredith, in the county of Venango and State of Pennsylvania, have invented a new and useful Improvement in Hot-Blast Gas-Separators, of which the following is a specification:

Figure 1 is a vertical longitudinal section of my improved apparatus. Fig. 2 is a top view of the same, the cover being removed.

Similar letters of reference indicate corresponding parts.

My invention has for its object to furnish an improved apparatus for removing the dangerous and explosive gases from refined petroleum-oil by forcing a strong current of heated air through the said oil when spread into a thin sheet or spray, thereby increasing its illuminating qualities, while rendering it safe. The invention consists of the combination of the fan-nozzle, apron, screen or screens, inlet-pipes, and outlet-pipes with each other and with the tank, and in the combination of the air-tank and the coil of steam-pipe with the fan-nozzle, apron, screen or screens, inlet-pipes, and outlet-pipes of the tank, as hereinafter fully described.

A is a tank, into the upper part of which, near one end, the oil is introduced through one or more pipes, B, and is received upon an apron, C, over which it spreads, and from which it flows upon one or more screens, D, placed a little lower than the apron C, and by which the oil is minutely divided, so that the current of air may come into contact with all its particles. E is a tank, supported upon a frame-work or other suitable rest, into which, near its top, the air is forced by a fan-blower, or by other suitable means, and from which it escapes near the bottom through the pipe F into the tank A. To the inner end of the pipe F is attached a fan-nozzle, G, from which the air escapes in a thin sheet, and which is so arranged that the current of air may pass through the tank A just below the screen D, so as to come in contact with the particles of oil as they drop from said screen, and remove from it the gases which would make it dangerous. The air and gas escape from the tank A through the pipe H. The oil, after being operated upon by the air, is drawn off through a pipe, I. The air, as it passes through the tank E, is heated by steam passing through the coil of pipe J, placed within the said tank, as shown in Figs. 1 and 2. The air may be used cold or heated, as may be desired. I prefer to use it heated, as it more thoroughly removes the dangerous gases. The tank A is provided with a tight cover, K, the middle part of which may be made of glass to allow the interior of the said tank to be inspected when desired. The oil is passed through the apparatus, and the dangerous and explosive gases removed, after the preparation of the oil has been finished or nearly finished, so that it may be perfectly safe when put into market.

I do not claim, broadly, subjecting petroleum or other oils in a comminuted or divided state to the action of air; but

Having thus described my invention, I claim as new and desire to secure by Letters Patent—

1. The combination of the fan-nozzle G, apron C, screen or screens D, inlet-pipes B F, and outlet-pipes H I with each other and with the tank A, substantially as herein shown and described.

2. The combination of the air-tank E and coil of steam-pipe J with the fan-nozzle G, apron C, screen or screens D, inlet-pipes B F, and outlet-pipes H I of the tank A, substantially as herein shown and described.

GEORGE W. MYERS.

Witnesses:
D. ROGERS,
J. L. BURGESS.